United States Patent [19]

Koino

[11] Patent Number: 5,491,826
[45] Date of Patent: Feb. 13, 1996

[54] MICROPROCESSOR HAVING REGISTER BANK AND USING A GENERAL PURPOSE REGISTER AS A STACK POINTER

[75] Inventor: Seiji Koino, Futyu, Japan

[73] Assignee: Kabushiki Kaisha Toshiba, Kawasaki, Japan

[21] Appl. No.: 68,104

[22] Filed: May 28, 1993

[30] Foreign Application Priority Data

Jun. 1, 1992 [JP] Japan .................... 4-140404

[51] Int. Cl.$^6$ ........................................ G06F 13/00
[52] U.S. Cl. ........................ 395/775; 364/DIG. 1
[58] Field of Search ............................ 395/775

[56] References Cited

U.S. PATENT DOCUMENTS

| | | | |
|---|---|---|---|
| 4,334,269 | 6/1982 | Shibasaki et al. | 395/775 |
| 4,352,157 | 9/1982 | Namimoto et al. | 395/775 |
| 5,101,486 | 3/1992 | Okamoto | 395/400 |
| 5,115,506 | 5/1992 | Cohen et al. | 395/725 |
| 5,165,033 | 11/1992 | Kawasaki et al. | 395/775 |
| 5,220,669 | 6/1993 | Baum et al. | 395/775 |
| 5,274,792 | 12/1993 | Sato | 395/425 |
| 5,293,594 | 3/1994 | Nojiri et al. | 395/400 |
| 5,313,644 | 5/1994 | Matsuo et al. | 395/800 |
| 5,321,823 | 6/1994 | Grundmann et al. | 395/425 |

*Primary Examiner*—Jack B. Harvey
*Assistant Examiner*—Paul R. Myers
*Attorney, Agent, or Firm*—Foley & Lardner

[57] ABSTRACT

A microprocessor having a register file has an execution unit, a register file for storing data or information for a task, and a bank ram. The register file includes a stack pointer, a general purpose register group having a plurality of registers for storing data used for the execution unit, and a special purpose register group for storing data of a task. The special purpose register group includes a current bank pointer, a processor status word (PSW), a preceding bank pointer, and a program counter. The bank ram is made up of a plurality of bank blocks. Each bank block consists of a predetermined unit banks. Each bank block is capable of storing the data of the register file per task. In the microprocessor described above, when a current task is switched to another task, the content of the stack pointer of the current task is set as one of the registers in the general purpose register group. The number of the unit blocks per bank block and the bit width of the stack pointer can be changed by the PSW.

10 Claims, 6 Drawing Sheets

MICROPROCESSOR HAVING REGISTER BANK AND USING A GENERAL PURPOSE REGISTER AS A STACK POINTER

BACKGROUND OF THE INVENTION

1. Field of the Invention

The present invention relates to a microprocessor having a register bank. Per task, register files, including contents of a general-purpose register group containing a stack pointer and contents of a special purpose register group are saved to and retrieved from a bank block in a bank ram of the register bank.

2. Description of the Prior Art

FIG. 1 shows a structure of a register bank in a conventional microprocessor or a microprocessor system. The structure of the register bank shown in FIG. 1 comprises a register file 103 made up of a special purpose register group 101 and a general purpose register group 102, and a bank RAM 104 consisting of 256 unit banks. The special purpose register group 101 in the register file 103 consists of a current bank pointer (CBP), a processor status word (PSW), a preceding bank pointer (PBP), a program counter (PC), and a stack pointer (SP).

The current bank pointer (CBP) is used in order to indicate the head position of unit banks in the bank ram 104 to which the contents of the general purpose register are stored. The processor status word PSW indicates the status of a current task. The preceding bank pointer (PBP) stores information or data of the head position of unit banks in the bank ram 104 to which the contents of the general purpose register 102 and the special purpose register group 101 in a previous task are stored. The program counter (PC) indicates an address of instruction to be executed by an execution unit. The stack pointer (SP) has a fixed bit width, for example, a 16 bit width.

As shown in FIG. 1, the general purpose register group 102 is composed of 16 registers (RW0 to RW15) each having a 16 bit width.

Each of the unit banks (BANK 0 to BANK 256) constituting the bank RAM 104 is made up of four registers each having 16 bits (not shown in detail in FIG. 1), the bank pointers such as the current bank pointer (CBP) and the previous bank pointer (PBP) designate one of the unit banks, respectively.

In general, the contents of the general purpose register group 102 in the register file 103 are saved into four successively connected unit banks (BANK 3, BANK 4, BANK 5, and BANK 6) in the bank RAM 104, and the contents of the special purpose register group 101 in the register file 103 are saved into two successively connected unit banks (BANK 1 and BANK 2) in the bank RAM 104.

Further, in the conventional microprocessor the number of the registers in the register file 103 saved to one bank block is fixed. For example, the number of the registers in the general purpose register group 102 whose contents are saved into the bank block in the bank ram 104 is fixed, namely the number is 16 in the structure of the register bank shown in FIG. 1

Where the term "bank block" means a unit bank or a group of unit banks to which the contents of a predetermined number of the registers in the general purpose register group 102 are saved.

In the structure of the conventional register bank described above, the number of the registers whose contents are saved to one bank block is fixed per bank block.

Accordingly, when there is a small number of contents in the general purpose register group 102 and the contents are saved into one bank block, unused unit banks exist in the bank block. It is a waste of hardware.

Moreover, when the stack pointer SP is seen as one of the special purpose registers, the following two problems (1) and (2) occur in the conventional microprocessor.

(1) A special instruction or new instruction for saving the content of the stack pointer SP to the bank RAM 104 must be added in an instruction set of the conventional microprocessor. In this case, the number of instructions in the instruction set of the conventional microprocessor must be increased; or (2) Instead of introducing the special instruction or the new instruction into the instruction set of the conventional microprocessor, for example, if an instruction such as a "load" instruction in the instruction set in the conventional microprocessor is used for saving the content of the stack pointer SP to the bank RAM 104, additional steps therefor must be required.

On the other hand, when the stack pointer SP is set as one part of the general purpose register 102, the special instruction for saving the content of the stack pointer SP described above is not required.

However, because the bit width of the stack pointer SP is fixed, for example, when the bit width of the stack pointer SP is wide, the number of the registers which are used in the microprocessor system as the general purpose registers 102 is decreased. In this case, the number of registers required for the general purpose register 102 is decreased. This is a problem.

As described above, in the structure of the register bank used for the conventional microprocessor in the prior art, the stack pointer SP is employed as a part of a special purpose register group or as a part of a general purpose register group.

As stated above, with a conventional microprocessor having the register bank, there are the drawbacks or the problems that:

When the stack pointer SP is seen as one of the special purpose registers in the special purpose register group, the special instruction or the new instruction for saving the content of the stack pointer to the bank RAM 104 must be newly added. In this case, the number of the instructions making up an instruction set in the microprocessor should be increased.

Instead of introducing the special instruction or the new instruction into the instruction set, for example, if an instruction such as a "load" instruction stored in the instruction set of the conventional microprocessor or microprocessor system is used for saving the content of the stack pointer SP to the bank RAM 104, additional steps, therefor, must be required.

On the other hand, when the stack pointer SP is used in the general purpose register group 102, the number of registers in the general purpose register group 102 to be used for the stack pointer SP is increased because the bit width of the stack pointer is fixed. In this case, the conventional microprocessor cannot use efficiently in area the general purpose register group 102.

SUMMARY OF THE INVENTION

Accordingly, an object of the present invention is to provide, with due consideration to the drawbacks of such a conventional microprocessor having the structure of the conventional register bank described above, a microprocessor having an improved structure of a register bank in which the bit width of a stack pointer can be changed and the number of the registers in a general purpose register can be also changed efficiently.

In accordance with a preferred embodiment, there is a microprocessor having a register bank, comprising:

execution means for executing instructions;

register file means for storing data for a task, the register file means comprising:

stack pointer means For storing addresses for tasks;

general purpose register means having a plurality of registers for storing data used for said execution means, and special purpose register means for storing data of a task, comprising a current bank pointer (CBP), a processor status word (PSW), a preceding bank pointer (PBP), and a program counter (PC);

bank ram means consisting of a plurality of bank blocks, each bank block consisting of a predetermined unit banks, and each bank block capable of storing said data of the register file per task, wherein when a current task is switched to another task, said stack pointer means of the current task is set as one of the registers in said general purpose register means.

According to another aspect of the present invention, in a microprocessor having a register bank described above, the number of the unit banks in said bank block is changed by said PSW.

According to another aspect of the present invention, in a microprocessor having a register bank described above, by two bits in said PSW, the number of the unit banks in said bank block is determined.

According to another aspect of the present invention, in a microprocessor having a register bank described above, the bit width of said stack pointer can be changed by the content of said PSW.

According to another aspect of the present invention, in a microprocessor having a register bank described above, one bit in said PSW designates the bit size of said stack pointer means.

According to another aspect of the present invention, in a microprocessor having a register bank described above, when the current task is switched, the content of said stack pointer means is saved as the first register in the registers of said general purpose register means to a bank block in the bank ram means.

According to another aspect of the present invention, in a microprocessor system such as said microprocessor described above; monitor means are provided for displaying information of tasks executed by said microprocessor means; and external memory means are provided for storing data executed by the said microprocessor, wherein said bank ram is used one part in said external memory means.

BRIEF DESCRIPTION OF THE DRAWINGS

For a more complete understanding of the present invention and the advantage thereof, reference is now made to the following description taken in conjunction with the accompanying drawings in which.

DETAILED DESCRIPTION OF THE PREFERRED EMBODIMENTS

First, the basic conception of a microprocessor or a microprocessor system with a register bank according to the present invention will be described.

Figure 2:
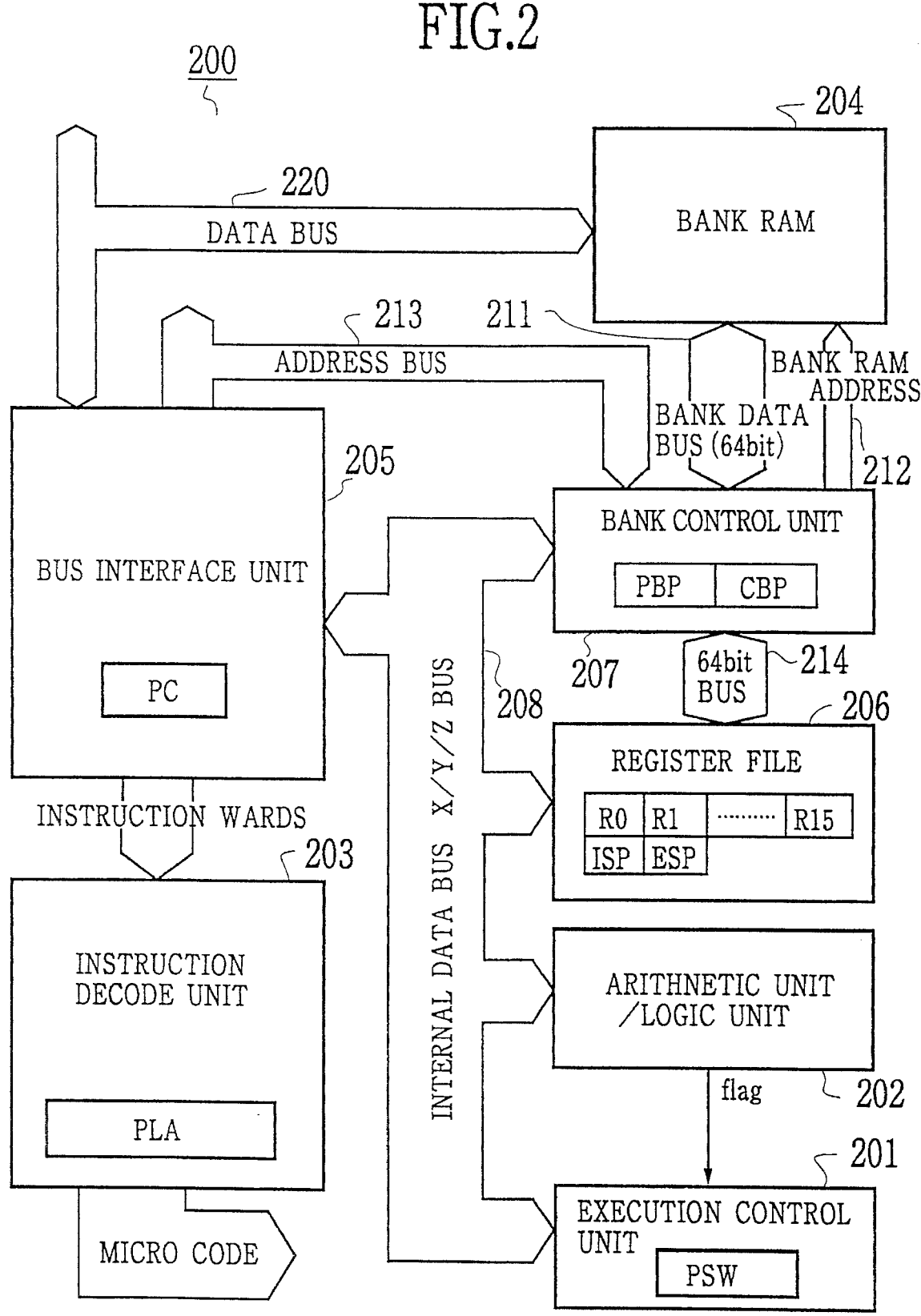
FIG. 2 shows a block diagram of a microprocessor or microprocessor system having a register bank as a preferred embodiment according to the present invention.

In the microprocessor with the register bank of the present invention, since the stack pointer SP is seen as one of the general purpose registers in the general purpose register group, the number of the registers in the general purpose register group and the number of unit banks in a bank block in a bank ram can be changed under the control of a processor status word which is one of the registers in a special purpose register group, FIG. 2 is a configuration diagram of the microprocessor or the microprocessor system 200 as a preferred embodiment according to the present invention.

In FIG. 2, the microprocessor 200 consists of an execution control unit 201, an arithmetic unit 202, an instruction decode unit 203, a bank RAM 204, a bus interface unit 205, a register file 206, and a bank control unit 207.

In the configuration of the microprocessor 200 shown in FIG. 2, through an internal bus 208 or X/Y/Z bus, the bus interface 205, the execution control unit 201, the arithmetic unit or a logic unit 202, the register file 206, and the bank control unit 207 are connected to each other.

The bus interface unit 205 is connected to the bank RAM 204 through data bus 220. The bank RAM 204 is connected to the bank control unit 207 through a bank data bus 211 of 64 bits and a bank ram address 212.

The bus interface unit 205 also is connected to the bank control unit 207 through the address bus 213.

The bank control unit 207 is connected to the register file 206 through a 64 bit bus 214.

Figure 3:
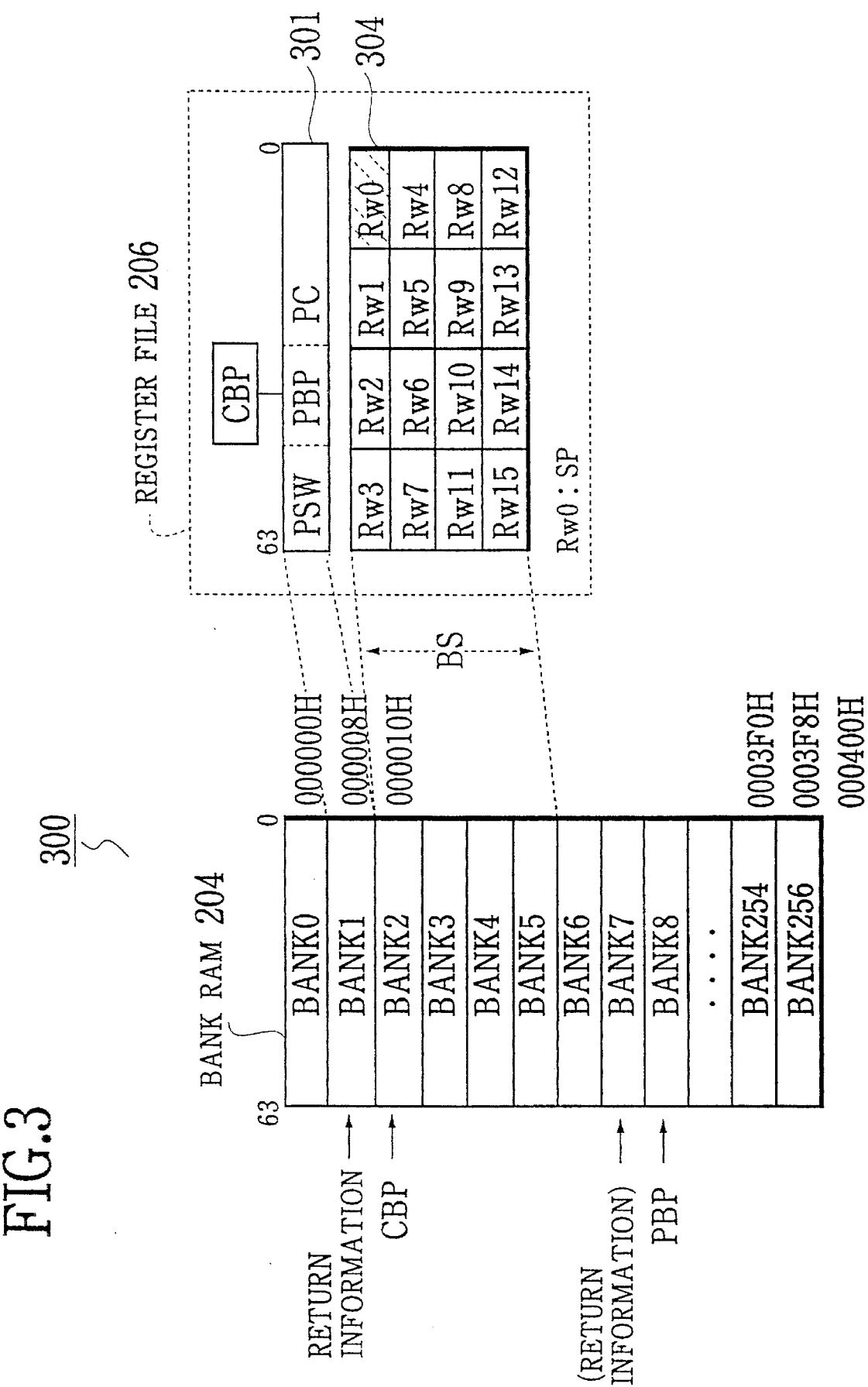
FIG. 3 shows a construction of a register bank in the microprocessor shown in FIG. 2 according to the present invention.

FIG. 3 shows the structure of the bank RAM 204 and the register file 206 and the relationship between them in the microprocessor 200.

In FIG. 3, the register bank 300 consists of a plurality of unit banks (unit BANK 0, unit BANK 1, unit BANK 2, . . . , and unit BANK 256). Any bank block is made up of a required number of the unit banks. In this embodiment the number of the unit banks per bank block may be changed under the control of a processor status word PSW that will be described below in detail.

The register file 206 is mainly made up of a special register group 301 and a general purpose register group 304.

Figure 1:
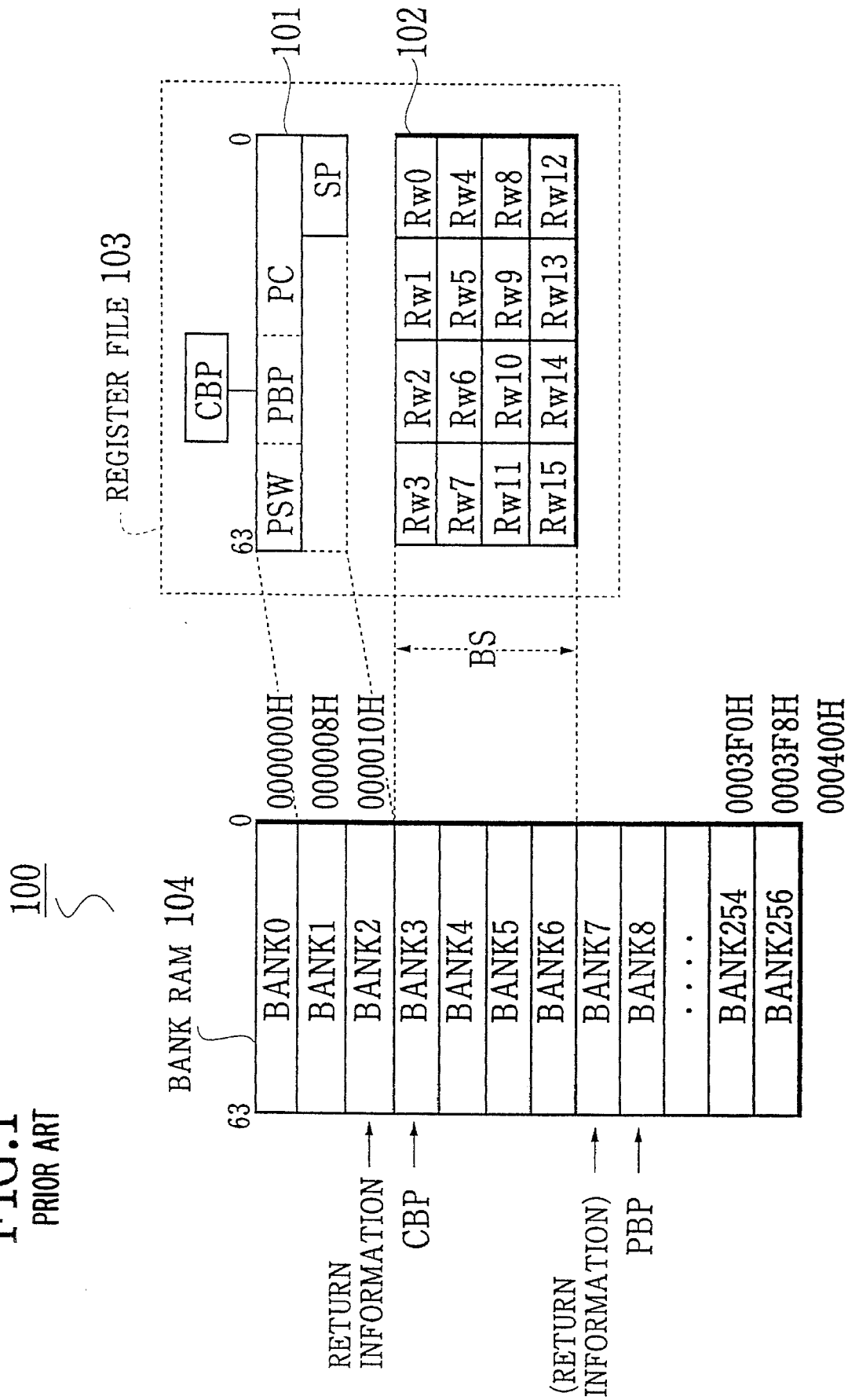
FIG. 1 shows a structure of a register bank in a conventional microprocessor.

The special register group 301 mainly consists of a current bank pointer CBP, a processor status word PSW, a preceding bank pointer PBP, and a program counter PC, similar to the special register group 301 without the stack pointer SP in the conventional microprocessor shown in FIG. 1.

Figure 4:
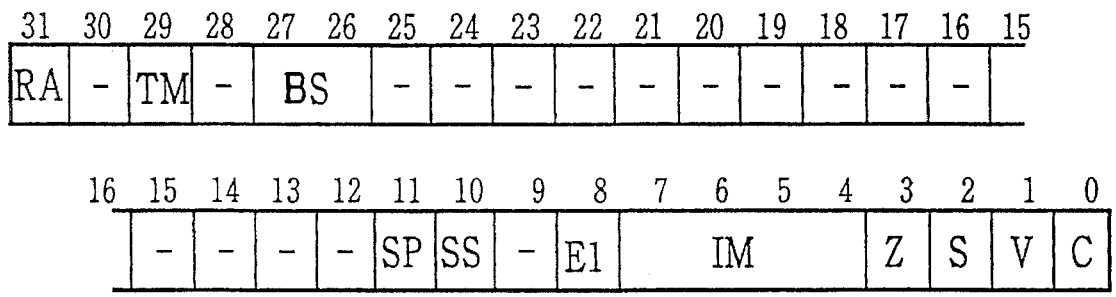
FIG. 4 shows in detail the structure of a processor status word PSW in a special purpose register group used in the structure of the register bank shown in FIG. 3 of the microprocessor shown in FIG. 2.

FIG. 4 is the configuration of the processor status word PSW in the special register group 301. In the processor status word PSW, the "RA" bit indicates whether a part of the general purpose register group 304 is used for a stack pointer, the bit "TM" is a task mode bit, the bits "BS" are bank size bits indicating the number of unit banks, and the bit "SP" is a stack pointer width bit indicating the bit width or bit size of the stack pointer SP.

The general purpose register group 304 consists of 16 registers each having 16 bit width. In this embodiment, the register Rw0 in the general purpose register group 304 is used for the stack pointer SP. But, other registers, such as one or more of RW1 to RW15 in the general purpose register group 304, may be used as the stack pointer SP.

In the embodiment, the bank ram 204 is used for saving the content of the register file 206. Because the bit width of all of the registers CBP, PSW, PBP, and PC in the special purpose register group 301 has 64 bits, one bank in the bank ram 204 is used in order to save the contents of the registers in the special purpose register group 301.

In the present invention, the number of the registers in the special purpose register group 301 and in the general purpose register group 304, which are saved into one bank block in the bank ram 204, can be changed based on the contents of the bank size bit "BS" and the stack pointer size bit "SP" in the processor status word PSW.

Specifically, the number of the registers RW0, RW1, RW2, . . . , RW15 to be saved as a group of the registers to one bank block is determined by the bank size "BS", because the bank size BS in the PSW designates the size (bit width) of the bank block. For example, when the bank size "BS" is "00" the bank block has four unit banks so that all of the registers RW0, RW1, . . . , RW15 in the general purpose register 304 are saved into the bank ram 204. When the bank size "BS" is "01", the bank block has three unit banks. In this case, the registers RW0 to RW11, for example, in the general purpose register 304 are saved into the bank ram 304. When the bank size "BS" is "10", the total number of the registers in the general purpose register group 304 to be saved into the bank block is eight, For example RW0 to RW7. When the bank size "BS" is "11" the total number of the registers in the general purpose register group 304 to be saved into the bank block is four, For example RW0 to RW3.

When a retrieve operation from the bank block to the general purpose register group 304 is executed, the number of the registers to be retrieved from the bank block is determined based on the bank size bit "BS".

In those cases described above, the content of the stack pointer SP is saved into the register RW0 which is the head or the first register in the general purpose register group 304.

In the embodiment, for example, when the current bank block according to the current process is switched to the preceding bank block, the stack pointer SP according to the preceding process, therefore, is invariably selected because the stack pointer SP is saved into the preceding bank block as one of registers in the general purpose register group 304.

In other words, when the current process or task is switched for changing the current executing routine to another task, the content of the stack pointer SP used in the current process or task is always saved as one of the registers in the general purpose register group 304 into a bank block according to the current process.

In this embodiment, the content of the stack pointer is saved into the register RW0 which is the head or first register in the general purpose register group 304.

Thus, in the structure of the register bank 300 including the bank ram 204 and the register file 206, return information to return back to the preceding task is stored in the current bank pointer CBP in the special purpose register group 301. When an interrupt occurs in the microprocessor system, the contents of the general purpose register group 304 are saved into a bank block in the bank ram 204 designated by the current bank pointer CBP.

At this time, the size of the bank block is determined by the bank size "BS", consisting of two bits in the current bank pointer CBP.

On the other hand, the contents of the special purpose register 301 are saved into a unit bank in the bank ram 204 which is addressed by the address obtained by subtracting one from the address designated by the current bank pointer CBP.

Figure 5:
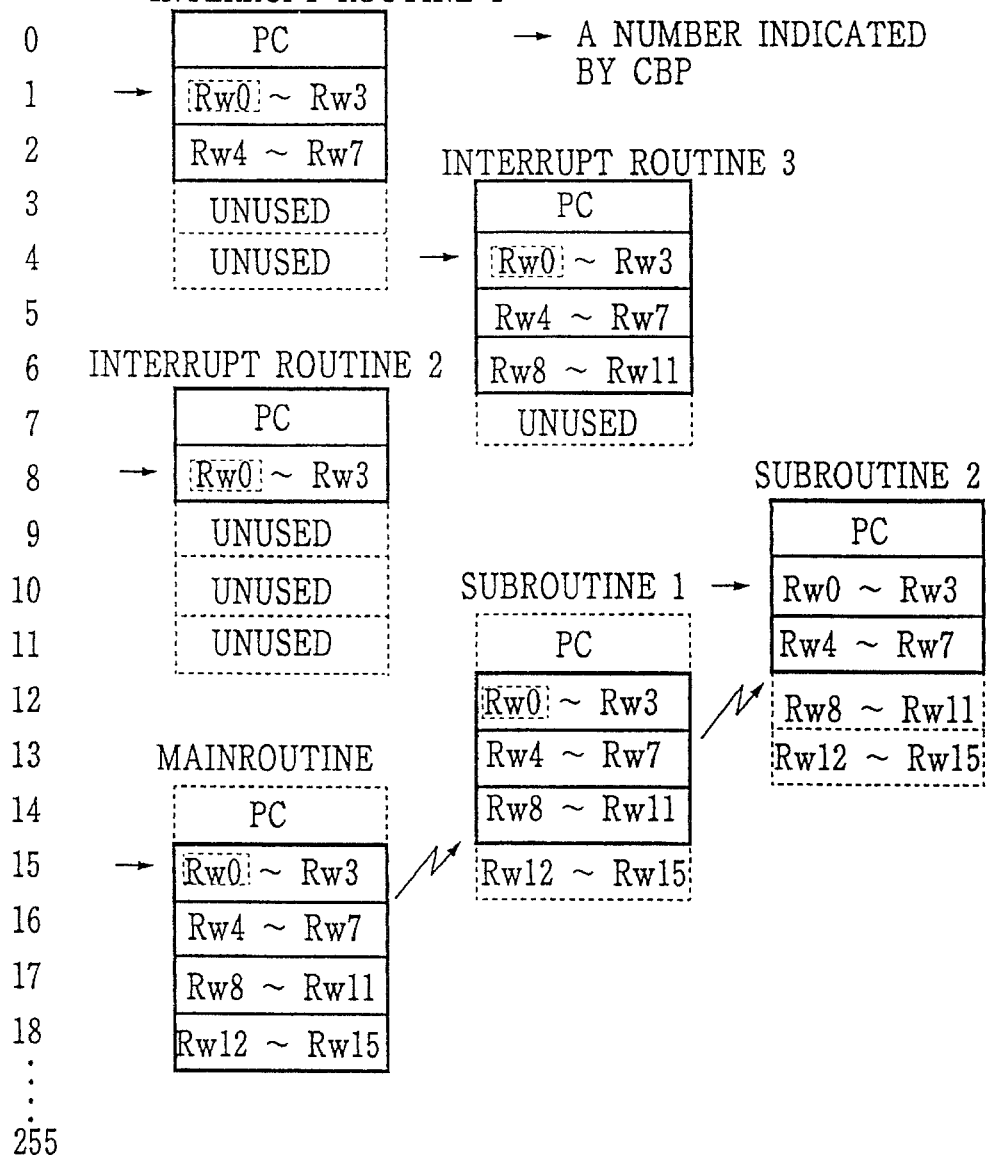
FIG. 5 shows the relationship between used unit banks and unused unit banks in bank blocks among tasks executed in the microprocessor shown in FIG. 2.

FIG. 5 shows the relationship among routines and bank blocks in several tasks in the structure of the register bank 300, as shown in FIG. 3, in the microprocessor 200 in this embodiment.

In FIG. 5, the main routine uses the unit banks 15 to 18, the interrupt routine 1 uses the unit banks 0 to 2, the interrupt routine 2 uses unit banks 7 and 8, the interrupt routine 3 uses the unit banks 3 to 6. Thus, these interrupt routines 1, 2, and 3 commonly use unused unit banks of each other. For example, the interrupt routine 3 uses the unit banks 3 and 4 which are in the bank block for the interrupt routine 1.

Thus, in the microprocessor 200 having the structure of the register bank 300 according to the present invention, when a current task is changed to another task, parameters relating to the current task information are transferred through unused unit banks in the banks block.

In addition, for a current task, since it is required to keep a unit bank in order to save the contents of the special purpose register group 301 of the current task for an interrupt request, the unit bank 9 is provided in the subroutine 2, as shown in FIG. 5.

On the other hand, because the main routine and the subroutine 1 are not executed at the present time, the unit banks 11 and 14 for saving the contents of the special purpose register group 301 for the main routine and the subroutine 1 are not required, so that the unit banks 11 and 14 are used for other tasks, for example the subroutines 1 and 2.

As described above in detail, in the embodiment of the microprocessor 200 with the register bank 300 according to the present invention, because the stack pointer SP is seen as the register RW0 in the general purpose register group 304, not depending on the number of the registers saved in a bank block used in a task, the content of the stack pointer SP is saved into the bank block, so that a special instruction for saving the content of the stack pointer SP into the unit bank in the bank ram 204 is not required.

Accordingly, by comparing the structure of the bank register 100 in the conventional microprocessor, the present invention can reduce executing steps required for the change of tasks. In addition, the bank size of a bank block can be changed to fit efficiently the size of the registers to be used in the general purpose register group 304 under a task. Therefore the microprocessor of the present invention can use efficiently the bank ram 204.

Figure 6:
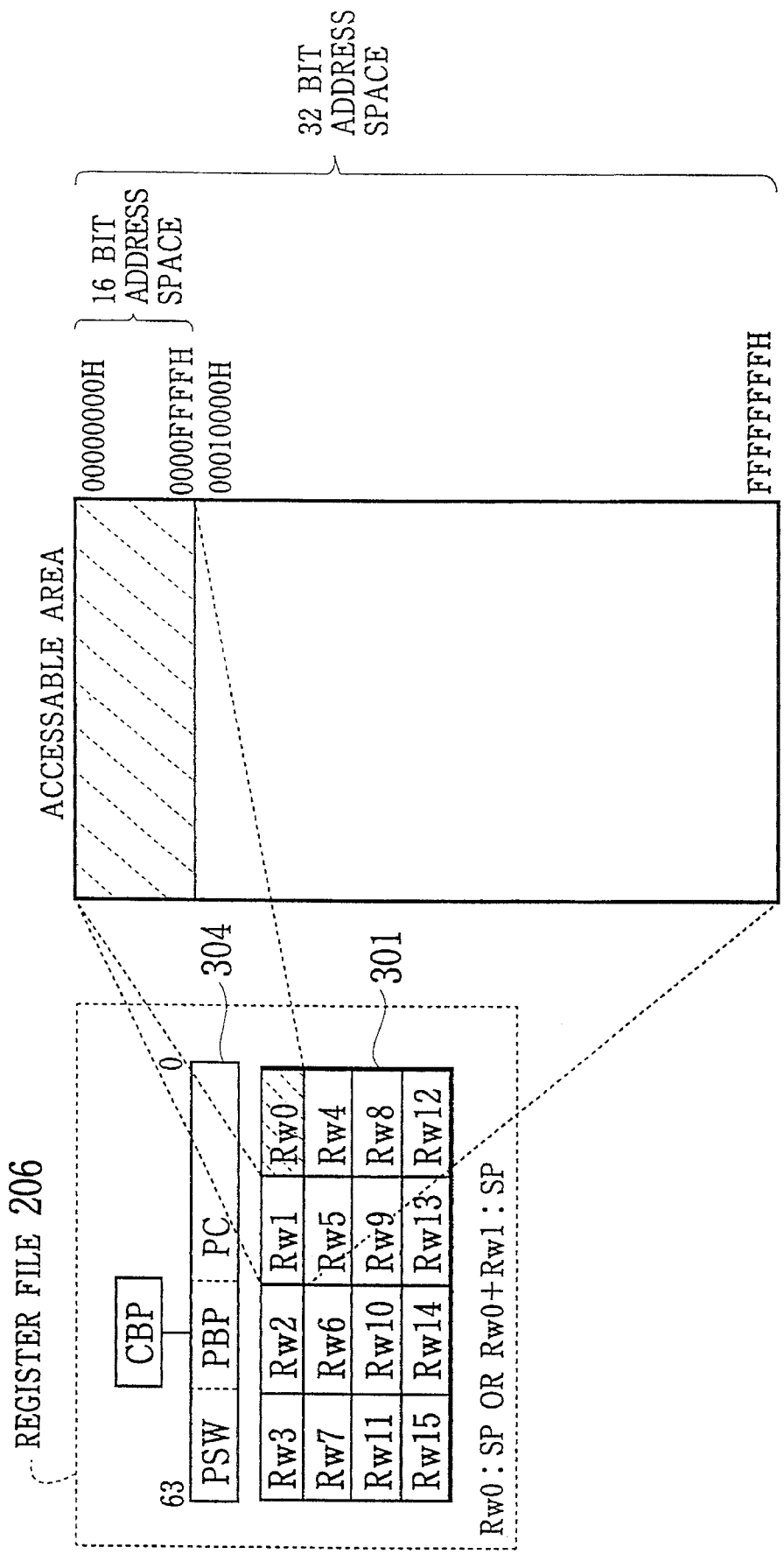
FIG. 6 shows an address space map according to a stack pointer SP when the bit size of the stack pointer is changed, for example the 16 bit width and the 32 bit width in the structure of the register bank shown in FIG. 3.

FIG. 6 shows an address space map when the bit size of the stack pointer SP is changed.

In FIG. 6, when the register RW0 is used for saving the stack pointer SP, the accessable address space of the stack pointer SP is 16 bit address space. When the registers RW0 and RW1 are used for the stack pointer SP, the accessible address space is 32 bit address space.

The size of the accessable address space of the stack pointer SP is changed based on the content of the stack pointer width bit "SP" (of one bit) in the processor status word PSW. The stack pointer SP is either 16 bits or 32 bits in width.

In those cases, when the register RW0 of 16 bit width is used for the stack pointer SP, the accessible address space of the stack pointer SP becomes 64 K bytes, so that the number of the registers, that can be used, in the general purpose register group 301 is 15 registers such as the registers of RW1 to RW15.

On the other hand, when a pair of the registers RW0 and RW1 of 16 bit width each are used for the stack pointer SP, the accessible address space of the stack pointer SP becomes 4G bytes, so that the number of the registers, that can be used, in the general purpose register group 301 is 14 registers such as the registers of RW2 to RW15.

Accordingly, when the size of the stack pointer SP to be required is within 64 K bytes, only one register such as the register RW0 in the general purpose register group 301 is used. In this case, by comparing the size of the stack pointer SP of the 32 bit width, the number of the registers in the general purpose register group 304 which can be used is increased by one. Therefore the registers in the general purpose register group 304 can be efficiently used.

By the way, in the case that the size of a bank block can be changed, that is to say, in the case that the number of the registers to be stored into the bank block is changed, for example, when the number of the registers in the general purpose register group 301 is 16 and the size of the stack pointer SP is fixed such as when it has a 32 bit width, the number of the registers to be stored into the bank block becomes 14. However, in this case, when the number of the registers to be stored into the bank block is 4 and the size of the stack pointer SP is a 32 bit width, the number of the registers to be stored into the bank block becomes 2.

Thus, when the number of the registers to be stored into a bank block is changed, namely the size of the bank block is decreased, for example, according to a change of the number of the registers to be stored into a bank block, the bit size of the stack pointer SP per one bank block will be increased.

Therefore, in this case, it must be required to increase the number of the registers to be stored into one bank block. This is a problem for the microprocessor in efficiency because the microprocessor has poor efficiency because the number of the registers unused in the general purpose register group 301 is increased.

In this case, it can eliminate the problem, described above, by changing the size of the stack pointer SP, for example from 32 bit width to 16 bit width, so that the number of the registers to be saved into the bank block may be increased by one.

As described above in detail, in the structure of the register bank 300 in the microprocessor 200 as the preferred embodiment according to the present invention in which the number of the registers to be saved into a bank block is changed, because the stack pointer SP is set into one of the registers in the general purpose register group 301, a special instruction in order to save the content of the stack pointer SP into a unit bank is not required or additional steps in order to save the content of the stack pointer SP are not needed, so that an increase in access speed can be achieved and the number of instructions in the instruction set in the microprocessor can be decreased.

In addition, in the present invention, the bit width of the stack pointer SP can be changed, so that the number of the registers in the general purpose register group 301 used in a current task can be saved efficiently into a bank block.

It is possible to fabricate the microprocessor of the embodiment described above on one chip.

However, it is possible to form the bank ram 204 which is separated from other structual elements in the microprocessor 200 such as the arithmetic unit 202, the execution control unit 201, bus interface unit 205, the instruction decode unit 203, the register file 206, and the bank control unit. In this case, the bank ram 204 may be formed into external memories.

Figure 7:
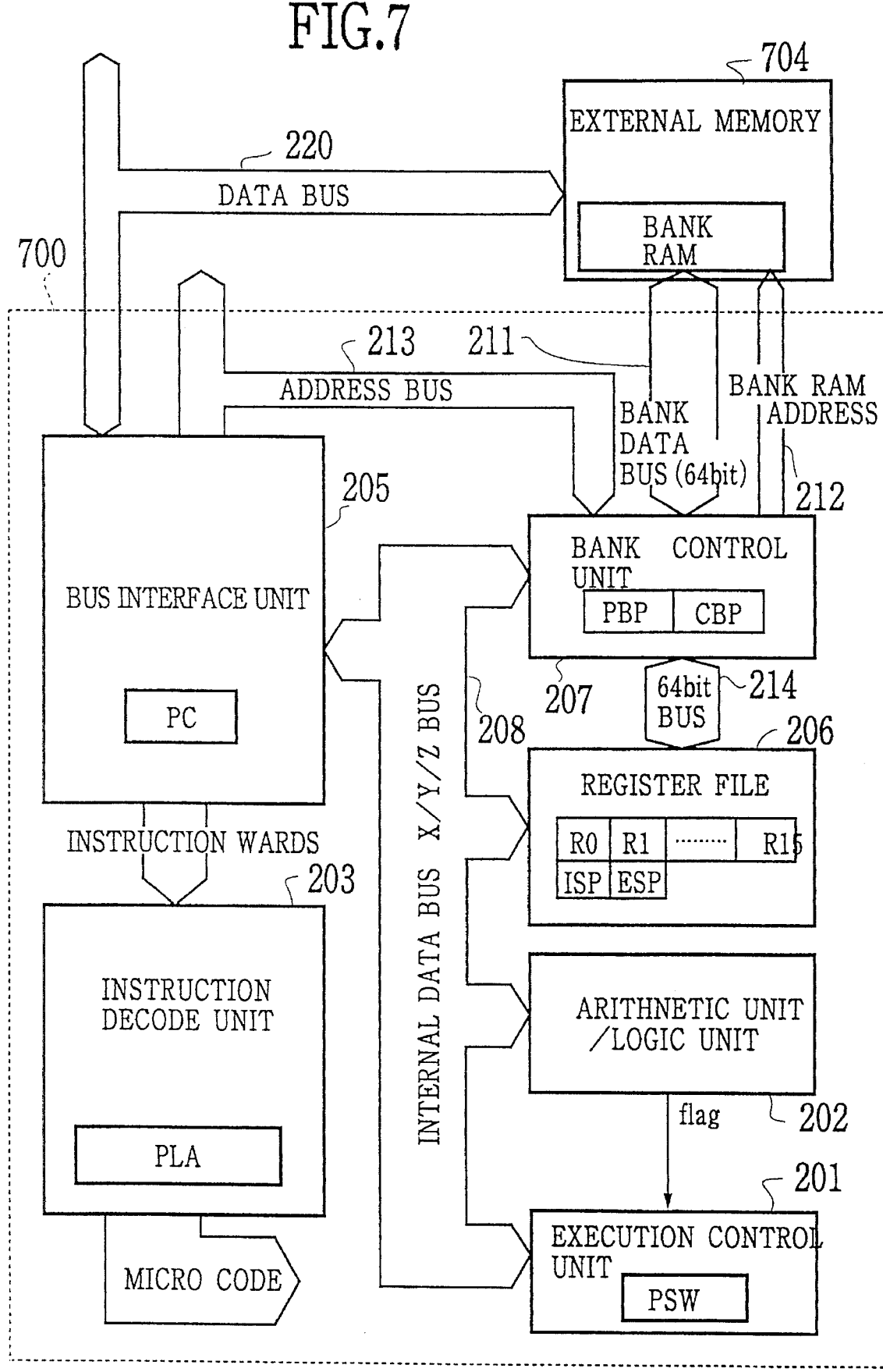
FIG. 7 shows a configuration of a microprocessor having a bank register in which a bank ram is formed outside of the microprocessor.

FIG. 7 shows a configuration of the microprocessor having a register bank in which the bank ram 204 is formed outside of the microprocessor 700. The other elements of the microprocessor 700 are equal to that of the microprocessor system 200 shown in FIG. 2. By this configuration of the microprocessor 700 the microprocessor having a bank register can be easily constructed.

Further, a microprocessor system including the microprocessor having the bank register described above is capable of performing tasks at high speed operations and of using the bank ram efficiently.

The scope of this invention is not limited to the preceding embodiment but includes numerous modifications that will be obvious to one skilled in the art.

For example, it is possible to change the bit width of the stack pointer SP and to change the number of the registers in the general purpose register group in accordance with the change of the processor status word PSW.

Moreover, it is also possible to change the bit width of the bank size bit BS in order to change the number of the unit banks in each bank block.

Furthermore, in the embodiment described above, the content of the stack pointer SP is set in the head register in the general purpose register group. However, this invention is not limited to the embodiment. For example, the stack pointer SP may be set to any register in the general purpose register group. In this case, a suitable bit or bits in the processor status word PSW may indicate the address of the stack pointer SP.

What is claimed is:

1. In a microprocessor having a register bank, and execution means for executing an instruction, register file means for storing data for a task, the register file means comprising:

stack pointer means for storing an address for the task;

general purpose register means comprising a plurality of registers for storing data used by the execution means;

special purpose register means for storing data relating to the task, the special purpose register means comprising a current bank pointer, a processor status word including a stack pointer size field indicating a bit width of the stack pointer, a preceding bank pointer, and a program counter; and bank ram means comprising a plurality of bank blocks, each bank block comprising a predetermined number of unit banks, and each bank block being for storing the data from the general purpose register means, wherein, when a current task is switched to another task, said stack pointer means of the current task is set as one of the registers in said general purpose register means, and wherein a bit width of said stack pointer means can be changed according to the contents of the stack pointer size field of the processor status word.

2. A microprocessor having a register bank according to claim 1, wherein the stack pointer size field comprises at least one bit.

3. A microprocessor according to claim 1, wherein said microprocessor is formed on one chip.

4. A microprocessor system as recited in claim 1, further comprising:

external memory means for storing data executed by the microprocessor, wherein said bank ram means includes part of said external memory means, and wherein said microprocessor is formed on one chip.

5. In a microprocessor having a register bank, and execution means for executing an instruction, register file means for storing data for a task, the register file means comprising:

stack pointer means for storing an address for the task;

general purpose register means comprising a plurality of registers for storing data used by the execution means;

special purpose register means for storing data relating to the task, the special purpose register means comprising a current bank pointer, a processor status word, a preceding bank pointer, and a program counter; and bank ram means comprising a plurality of bank blocks, each bank block comprising a predetermined number of unit banks, and each bank block being for storing the data from the general purpose register means, wherein, when a current task is switched to another task, the stack pointer means of the current task is set as one of the registers in said general purpose register means, and wherein a portion of the processor status word, a bank size field, indicates a size of the bank block such that the number of unit banks in the bank block is changed by the contents of the bank size field.

6. A microprocessor having a register bank according to claim 4, wherein the bank size field comprises at least two bits.

7. A microprocessor according to claim 5, wherein said microprocessor is formed on one chip.

8. A microprocessor system as recited in claim 5, further comprising:

external memory means for storing data executed by the microprocessor, wherein said bank ram means includes part of said external memory means, and wherein said microprocessor is formed on one chip.

9. In a microprocessor having a register bank, and execution means for executing an instruction, a register file storing data for a task, the register file comprising:

a stack pointer for storing an address for the task;

a general purpose register group comprising a plurality of registers storing data used by the execution means;

a special purpose register group storing data relating to the task, the special purpose register group comprising a current bank pointer, a processor status word, a preceding bank pointer and a program counter; and a bank ram comprising a plurality of bank blocks, each bank block comprising a designated number of unit banks, and being for storing data from the register file for the task, wherein, when a current task is switched to another task, the stack pointer of the current task is set as one of the registers in the general purpose register group, and wherein a portion of the processor status word, a bank size field, indicates a size of the bank block such that the number of unit banks in the bank block is changed by the contents of the bank size field, and wherein the set width of the stack pointer can be changed by the contents of a stack pointer size field in the processor status word.

10. A microprocessor system as recited in claim 9, further comprising:

an external memory for storing data executed by the microprocessor, wherein said bank ram includes part of said external memory and said microprocessor is formed on one chip.

* * * * *